United States Patent

Kiefer et al.

[15] 3,691,234

[45] Sept. 12, 1972

[54] N-ACYLATED CYCLOALKYLHYDROXYLAMINES

[72] Inventors: Hans Kiefer, Wachenheim; Adolf Fischer, Mutterstadt, both of Germany

[73] Assignee: Badische Anilin- & Soda-Fabrik Aktiengesellschaft, Ludwigshafen (Rhine), Germany

[22] Filed: June 16, 1970

[21] Appl. No.: 46,834

[30] Foreign Application Priority Data

June 20, 1969 Germany..........P 19 31 386.1

[52] U.S. Cl...................260/545 R, 71/106, 71/113, 71/118, 71/119, 260/453 R, 260/468 C, 260/500.5 H
[51] Int. Cl.....................C07c 125/00, C07c 135/00
[58] Field of Search....................260/545, 500.5, 453

[56] References Cited

UNITED STATES PATENTS 3,567,776   3/1971   Krenzer et al.............260/545

OTHER PUBLICATIONS

Konstantinova et al., Journal of Organic Chemistry U.S.S.R. 4, 1552 (1968)

*Primary Examiner*—Lorraine A. Weinberger
*Assistant Examiner*—Robert Gerstl
*Attorney*—Johnston, Root, O'Keeffe, Keil, Thompson & Shurtleff

[57] ABSTRACT

New and valuable N-acylated cyclo-alkylhydroxylamines having a strong herbicidal action, and a process for controlling the growth of unwanted plants with these compounds.

2 Claims, No Drawings

N-ACYLATED CYCLOALKYLHYDROXYLAMINES

The present invention relates to new and valuable N-acylated cycloalkylhydroxylamines and herbicides containing these active ingredients.

It is known to use N-isopropyl chloroacetanilide for the selective control of weeds (U.S. Pat. No. 2,863,752); however, its herbicidal action is not satisfactory.

We have now found that a good herbicidal action is obtained with N-acylated cycloalkylhydroxylamines having the formula

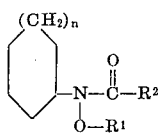

where $R^1$ denotes hydrogen or a lower alkyl radical (methyl, ethyl, propyl, isopropyl, butyl, isobutyl), a lower acyl radical (acetyl, propionyl) which may be substituted by chlorine, or a radical having the formula

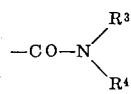

$R^3$ denoting a lower alkyl radical (methyl, ethyl, propyl) and $R^4$ denoting hydrogen or a lower alkyl radical (methyl, ethyl, propyl), $R^2$ denotes a lower alkyl radical (methyl, ethyl, propyl, isopropyl, butyl, isobutyl) which may be substituted by chlorine, $R^2$ may further denote a lower alkoxy radical (methoxy, ethoxy, propoxy, isopropoxy), or a radical having the formula

$R^5$ denoting a lower alkyl radical (methyl, ethyl, propyl, isopropyl, butyl, isobutyl) and $R^6$ denoting hydrogen or a lower alkyl radical (methyl, ethyl, propyl), and $n$ denotes one of the integers from 1 to 7.

The monoacylated active ingredients may be prepared for example by reacting the appropriate cycloalkylhydroxylamines with equivalent amounts of the appropriate carboxylic chlorides, carbamyl chlorides or chloroformic esters in the presence of an acid acceptor or by reaction with the appropriate isocyanates.

The diacylated cycloalkylhydroxylamines may be obtained by the same method from the monoacylated cycloalkylhydroxylamines, the reaction often being advantageously carried out at elevated temperature.

Diacylation products in which $R^1$ and $R^2$ have the same meanings may also be obtained in one step by heating with excess acylating agent.

The following data illustrate the preparation of the active ingredients; parts are by weight.

N-chloroacetyl-N-cyclohexylhydroxylamine

At a temperature of 10° to 15° C and while stirring, 113 parts of chloroacetyl chloride is added in portions to 115 parts of N-cyclohexylhydroxylamine and 110 parts of sodium bicarbonate in 500 parts of dioxane. The reaction mixture is subsequently kept for a few hours at the same temperature, and freed from inorganic salts by filtration. The solvent is distilled out of the filtrate and the distillation residue washed twice with water. After drying, 153 parts (80 percent of the theory) of N-chloroacetyl-N-cyclohexylhydroxylamine having a melting point of 122° to 127° C is obtained. The substance is recrystallized from benzene with hardy any loss. The melting point of such a sample is 132° to 134° C.

N-chloroacetyl-O-methylcarbamoyl-N-cyclohexylhydroxylamine

At 50° C and while stirring, 40 parts of methyl isocyanate is added in portions to a suspension of 100 parts of N-chloroacetyl-N-cyclohexylhydroxylamine in 200 parts of benzene. The crystals of the N-chloroacetyl compound go into solution within an hour. The solvent is distilled from the reaction mixture and the distillation residue recrystallized from aqueous methanol. After drying, 108 parts (83 percent of the theory) of the required substance, which has a melting point of 83° to 86° C, is obtained.

O,N-dimethylcarbamoyl-N-cyclohexylhydroxylamine (=N-cyclohexyl-N-methylcarbamoyloxy-N'-methylurea)

At 50° to 60°C and while stirring, 62 parts of methyl isocyanate is added in portions to 172 parts of N-cyclohexylhydroxyl-amine in 800 parts of benzene. The reaction mixture is kept for a further 3 hours at the same temperature before being cooled and suction filtered. The filter residue is washed once with benzene and dried in vacuo. 210 parts (91 percent of the theory) of the required substance, which has a melting point of 173° to 175° C, is obtained.

The other compounds may be prepared by analogous methods. Active ingredients having the following formula are given by way of example

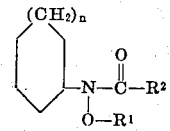

| $R^1$ | $R^2$ | n | m.p. |
|---|---|---|---|
| H | OCH(CH₃)₂ | 1 | 83–85°C |
| H | CH₂-CH₃ | 1 | 78°C |
| H | CH(CH₃)₂ | 1 | 118°C |
| H | NHCH₃ | 1 | 160°C |
| H | N(CH₃)₂ | 1 | 113°C |
| CH₃ | NHCH₃ | 1 | 92°C |
| CH₃CO | NHCH₃ | 1 | 129°C |
| CH₃NHCO | NHCH₃ | 1 | 175°C |
| CH₃NHCO | N(CH₃)₂ | 1 | 103–106°C |
| H | NHCH₃ | 3 | 148°C |
| H | N(CH3)₂ | 3 | 124°C |
| ClCH₂CO | N(CH₃)₂ | 3 | oil |
| H | NHCH₃ | 7 | 149°C |
| H | N(CH₃)₂ | 7 | 137°C |
| H | CH₂Cl | 7 | 174°C |
| CH₃NHCO | CH₂Cl | 7 | 135°C |

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C, e.g. tetrahydronaphthalene or alkylated naphthalenes, or organic liquids having boiling points higher than 150° C and having one or more than one functional group, e.g. the keto group, the ether group, the ester group or the amide group, this group or these groups being attached as substituent (s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following examples demonstrate the application of the active ingredients according to the invention.

EXAMPLE 1

Loamy sandy soil is filled into pots and sown with the seeds of Indian corn (Zea mays), cotton (Gossypium sp.), soya bean (Glycine Lispida), rape (Brassico napus), barnyard grass (Echinochloa crusgalli), large crabgrass (Digitaria sanguinalis), green foxtail (Setaria viridis), annual bluegrass (Poa annua), and orchardgrass (Dactylis glomerata). The soil prepared in this manner is then treated with 4kg per hectare of N-chloroacetyl-N-methylcarbamoyloxy-N-cyclohexyl-hydroxylamine (I) and, for comparison, with 4kg per hectare of N-isopropyl chloroacetanilide (II), these amounts of the active ingredients each being dispersed in 500 liters of water per hectare. After 4 to 5 weeks it is ascertained that active ingredient I has a stronger herbicidal action than II.

The results of the experiment are given in the following table:

| | Active ingredient I | II |
|---|---|---|
| Indian corn | 0 | 0 |
| Cotton | 0 | 0–10 |
| Soya bean | 0–10 | 0–10 |
| Rape | 0–10 | 0 |
| Barnyard grass | 90–100 | 70–80 |
| Large Crabgrass | 80–90 | 70–80 |
| Green foxtail | 90 | 70–80 |
| Annual bluegrass | 90 | 90 |
| Orchardgrass | 80–90 | 80 |

0 = no action
100 = complete destruction

EXAMPLE 2

In a greenhouse, the plants Indian corn (Zea mays), soya bean (Glycine hispida), cabbage (Brassica oleracea), barnyard grass (Echinochloa crus-galli), annual bluegrass (Poa annua), and orchardgrass (Dactylis glomerata) are treated at a growth height of 2 to 12 cm with 3kg per hectare of N-chloroacetyl-N-methylcarbamoyloxy-N-cyclohexylhydroxylamine dispersed in 500 liters of water per hectare. After 10 to 14 days the grass weeds begin to wither and after 3 to 4 weeks the weeds barnyard grass, annual bluegrass and orchardgrass are withered, whereas the crop plants Indian corn, soya bean and cabbage continue to grow undamaged.

The action of N-chloroacetyl-N-cyclohexylhydroxylamine corresponds to that of I in Examples 1 and 2.

EXAMPLE 3

The plants rice (Oryza seativa), Indian corn (Zea mays), wild mustard (Sinapis arvensis), barnyard grass (Echinochloa crus-galli) and green foxtail (Setaria viridis) are treated at a growth height of 3 to 15cm with 3kg per hectare of N-propionyl-N-cyclohexylhydroxylamine (A) emulsified in 500 liters of water per hectare. After 3 to 4 weeks the results given below are obtained:

| | A |
|---|---|
| Crop plants | |
| Rice | 0 |
| Indian corn | 0 |
| Unwanted plants | |
| Wild mustard | 95 |
| Barnyard grass | 100 |
| Green foxtail | 95 |

0 = no damage
100 = complete destruction

EXAMPLE 4

70 parts by weight of N-chloroacetyl-O-methylcarbamoyl-N-cyclohexylhydroxylamine is mixed with 30 parts by weight of N-methyl-α-pyrrolidone. A mixture is obtained which is suitable for application in the form of very fine drops.

EXAMPLE 5

20 parts by weight of N-chloroacetyl-N-cyclohexylhydroxylamine is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 6

Twenty parts by weight of N-propionyl-N-cyclohexylhydroxylamine is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 7

Twenty parts by weight of N-chloroacetyl-N-cyclohexylhydroxylamine is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 8

Thirty parts by weight of N-chloroacetyl-O-methyl-carbamoyl-N-cyclohexylhydroxylamine is intimately mixed with a mixture consisting of 92 parts by weight of powdered silica gel and 8 parts by weight of paraffin oil which has been sprayed onto the surface of this silica gel. A formation of the active ingredient is obtained having good adherence.

We claim:

1. An N-acylated cycloalkylhydroxylamine having the formula

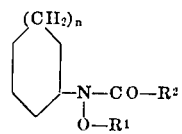

where $R^1$ is the radical

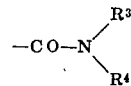

wherein $R^3$ is lower alkyl and $R^4$ is hydrogen or lower alkyl, $R^2$ is lower alkyl substituted by chlorine, and $n$ is an integer of 1 to 7.

2. N-chloroacetyl-O-methylcarbamoyl-N-cyclohexylhydroxylamine.

* * * * *